(12) United States Patent
Schreff et al.

(10) Patent No.: US 6,877,504 B2
(45) Date of Patent: Apr. 12, 2005

(54) SELF-CONTAINED TEMPERATURE-CHANGE CONTAINER ASSEMBLIES

(75) Inventors: H. Joshua Schreff, Mercer Island, WA (US); Massimiliano Rizzi, Los Angeles, CA (US)

(73) Assignee: Self-Heating Technologies Corporation, Greenwich, CT (US)

( * ) Notice: Subject to any disclaimer, the term of this patent is extended or adjusted under 35 U.S.C. 154(b) by 14 days.

(21) Appl. No.: 10/613,322

(22) Filed: Jul. 3, 2003

(65) Prior Publication Data

US 2005/0000506 A1 Jan. 6, 2005

(51) Int. Cl.[7] .................................................. F24J 1/00
(52) U.S. Cl. ..................... 126/263.09; 62/4; 206/222
(58) Field of Search ...................... 126/263.09, 263.06, 126/263.07, 263.08, 263.01, 261, 262; 206/219, 222; 62/4, 294

(56) References Cited

U.S. PATENT DOCUMENTS

| | | | | |
|---|---|---|---|---|
| 654,174 A | * | 7/1900 | Murmann et al. | ..... 126/263.09 |
| 3,213,932 A | * | 10/1965 | Gottfurcht et al. | ..... 126/263.09 |
| 3,970,068 A | * | 7/1976 | Sato | ........................ 126/263.08 |
| 4,793,323 A | * | 12/1988 | Guida et al. | ............ 126/263.08 |
| 5,626,022 A | * | 5/1997 | Scudder et al. | .................... 62/4 |

FOREIGN PATENT DOCUMENTS

JP            4-54922 A    *    2/1992

* cited by examiner

Primary Examiner—Josiah C. Cocks
(74) Attorney, Agent, or Firm—Michael L. Crapenhoft

(57) ABSTRACT

A container assembly heats or cools a product inside an inner container. An outer jacket at least partially surrounds the inner container, with a first internal volume and a second internal volume in the space between the outer jacket and the inner container. A first temperature-change reagent is contained inside the first internal volume, and a second temperature-change reagent is held in the second internal volume, with a reagent separator between the two. Several penetrators are disposed to penetrate the reagent separator to produce openings through the separator and through which the two reagents can mix. Steel wool inside the first internal volume acts as a steam condenser. The outer jacket includes a jacket top ring secured around an upper surface of a standard can, a jacket body secured to the jacket top, and a flexible jacket bottom that carries several spikes molded onto the jacket bottom.

23 Claims, 19 Drawing Sheets

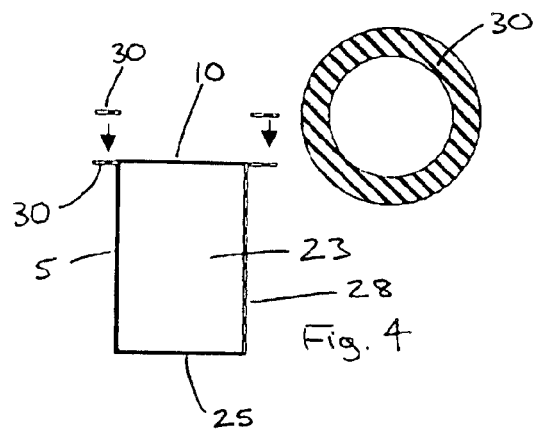
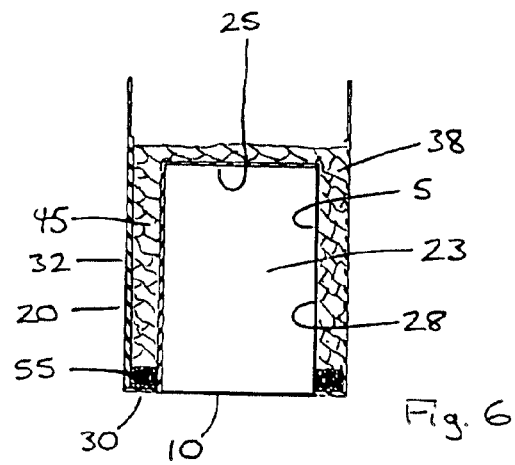
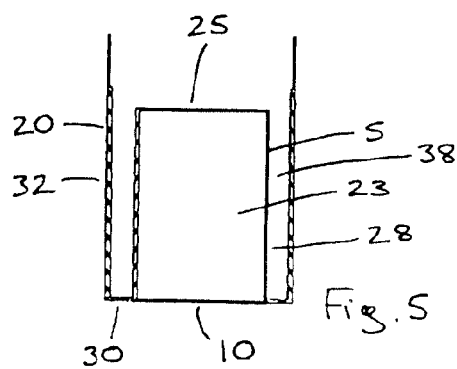
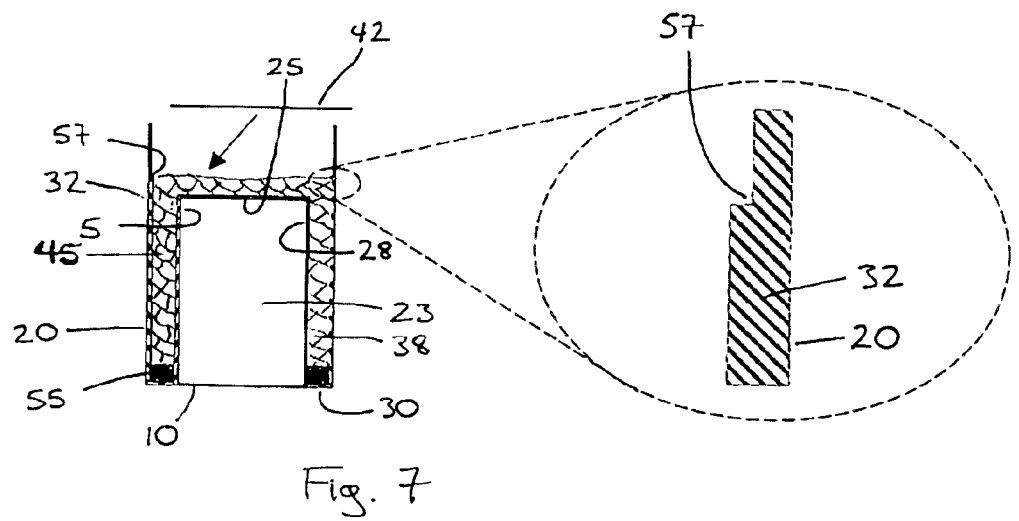

SELF-CONTAINED TEMPERATURE-CHANGE CONTAINER ASSEMBLIES

BACKGROUND OF THE INVENTION

The invention relates generally to containers and apparatus for heating or cooling materials held inside containers. More particularly, the invention provides a can or a similar container for holding a food product or another material, and a self-contained assembly for heating or cooling the container and the material within it to a temperature above or below the material's storage temperature. In a preferred embodiment, a standard metal can holds a quantity of a food or beverage. A jacket or housing surrounds the can, with reagents for an exothermic or endothermic temperature-change reaction inside the jacket in proximity to the can. Activating the device initiates the reaction to heat or cool the can and its contents.

Devices of this general type are known in the art. Some such devices include a food container in proximity to a reagent storage vessel. The reagent storage vessel holds a quantity of calcium oxide and a quantity of water, with a barrier between them to keep the two reagents separated. The devices include some mechanism for breaching the barrier to allow the calcium oxide and water to mix. When this occurs, the resulting exothermic reaction generates heat that is transferred into the food container to raise the temperature of a food product inside the container.

The prior art devices suffer from various deficiencies, though. Some of the devices are prone to leak either steam or heated reactants from the reagent mixture. These devices can be hazardous in use. Concern over the possible injuries to users has severely hindered the acceptability of these devices in the marketplace. Other devices do not adequately control the rate of the reaction after its initiation. The reaction may proceed either too fast or too slow, and too much or too little heat may be transferred to the food. Other devices are overly complex, and difficult, expensive, or time-consuming to manufacture, assemble, use and dispose of. For these reasons and others, there has never been an acceptable mass-market, self-heating product until now.

A need exists, therefore, for self-contained temperature-change container assemblies that are improved in comparison with those of the prior art. Such an assembly should be safe and reliable in use, and easy and inexpensive to manufacture. Container assemblies of this type, and methods for manufacturing in them, are described below in this document.

SUMMARY OF THE INVENTION

The invention is embodied in a self-contained, temperature-change container assembly operable to heat or cool a product packaged inside an inner container inside the assembly. The product may be a food or beverage, or it may be another type of product.

A preferred embodiment of the assembly includes an outer jacket that at least partially surrounds the inner container, with a first internal volume and a second internal volume in the space between the outer jacket and the inner container. A first temperature-change reagent is contained inside the first internal volume, and a second temperature-change reagent is held in the second internal volume, with a reagent separator between the two.

The preferred embodiment includes a movable member with several penetrators situated to penetrate the reagent separator to produce openings through the separator and through which the two reagents can mix. Mixing the reagents initiates a chemical reaction—exothermic or endothermic—in order to heat or cool the inner container and a product contained within it.

In the preferred embodiment, the first temperature-change reagent is calcium oxide and the second temperature-change reagent is liquid water. Mixing the two results in an exothermic reaction that generates heat to raise the temperature of the product inside the container.

In a particularly preferred embodiment, steel wool is provided inside the first internal volume. The steel wool, which is an efficient thermal conductor with a large surface area, acts as a steam condenser to control the formation of steam generated by the reaction.

The outer jacket can comprise a jacket top ring secured in place around an upper surface of a standard can, a jacket body secured to the jacket top, and a flexible jacket bottom that acts as a movable member and which carries several penetrators in the form of spikes molded onto the jacket bottom.

The assembly can be manufactured by fixing a jacket top ring around a sealed inner container, fixing a jacket body onto the jacket top ring, filling first and second reagents inside the jacket body with a reagent separator between them, and then installing a flexible jacket bottom onto the jacket body with penetrators or spikes provided opposite the reagent separator.

Preferred embodiments will use standard size cans so that a food or beverage manufacturer or canner may designate some units of its output for sale to consumers as usual, and other units for inclusion in temperature-change container assemblies according to the invention, with minimal, if any, retooling or manufacturing changes being required of the food manufacturer.

BRIEF DESCRIPTION OF THE DRAWINGS

FIG. 4 depicts the attachment of an annular jacket top ring to a container in the manufacturing of the container assembly of FIGS. 1–3.

FIG. 5 illustrates the assembly of a jacket body around the jacket top ring of FIG. 4.

FIG. 6 shows the filling of a steam condenser and a first reagent between the jacket body and the container of FIGS. 4 and 5.

FIG. 7 illustrates the installation of a reagent separator into the jacket body of FIGS. 4–6.

DESCRIPTION OF THE PREFERRED EMBODIMENTS

An exemplary embodiment of the invention is a self-contained temperature-change container assembly that is assembled around a standard food can or a similar container that holds a food product or another item that will be heated or cooled inside the container.

Figure 1:
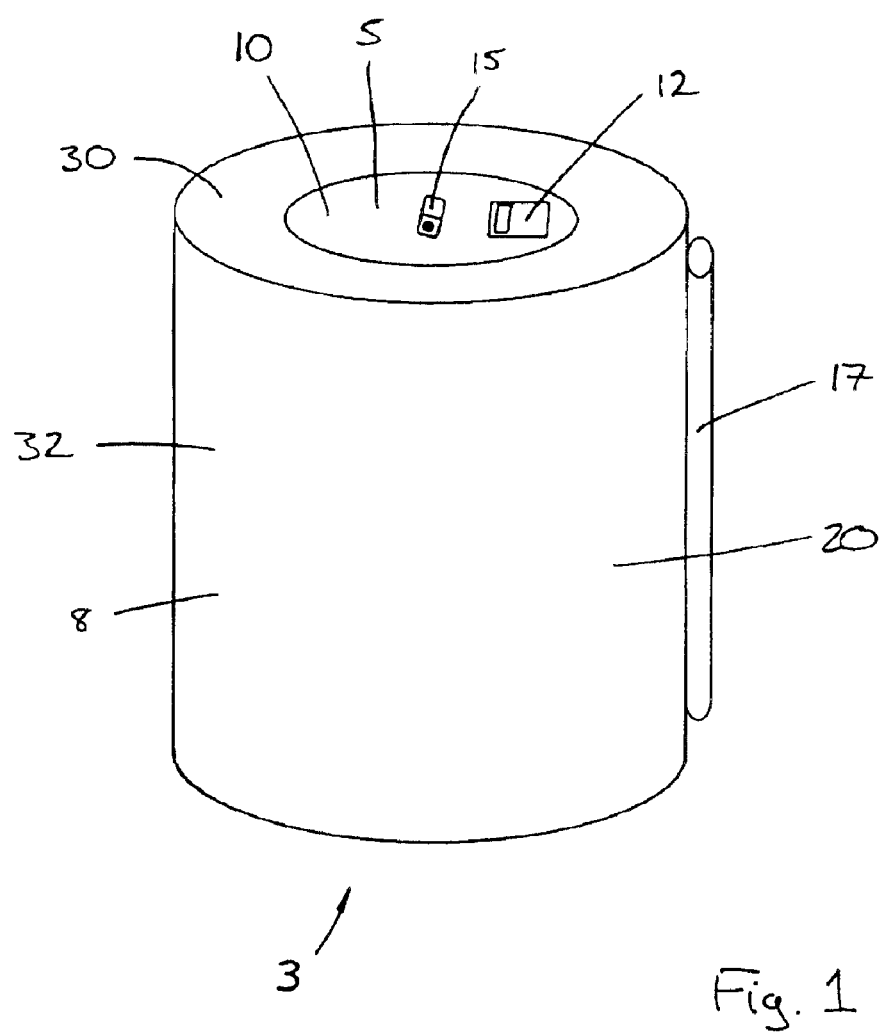
FIG. 1 is a perspective view of a self-contained temperature-change container assembly that embodies the invention.

FIG. 1 is a perspective view illustrating a container assembly 3 embodying the invention. The container assembly is assembled around an inner container 5—in this embodiment, a cylindrical metal can that holds a quantity of a food or beverage.

The inner container 5 is partially enclosed inside an outer jacket 8, with the top 10 of the inner container exposed. A user can remove or open the can's top using a pull-tab opener 12, a mechanical can opener (not shown), or other conventional means.

A visual indicator 15 is provided on the top 10 of the can 5 or elsewhere in a suitable location. This indicator's color or appearance changes to signal that the can's top 10 (and by implication the food or beverage inside) has reached a desired predetermined temperature, and that the can's contents are thus ready to eat or drink. Before the assembly is activated, the visual indicator serves as a guard against tampering and a confirmation that the container assembly 3 remains undisturbed and ready for use.

A disposable utensil 17—which might be a drinking straw, a one-piece or two-piece plastic fork or spoon, or a combination spoon/fork (a "spork")—can be attached by an adhesive or other similar means to the outer wall 20 of the jacket 8. This utensil can be packaged for security and cleanliness inside a plastic or cellophane wrapper. A napkin or a moist disposable wipe (not shown) might be provided as well. The entire assembly can be shrink-wrapped or made to incorporate a tamper-evident plastic lid.

Figure 2:
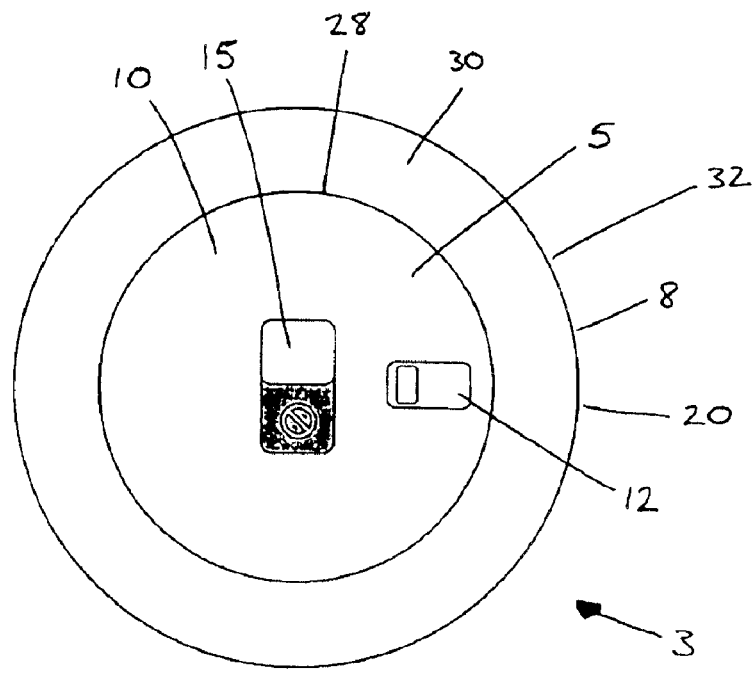
FIG. 2 is a top view of the container assembly of FIG. 1.

FIG. 2 is a top view of the container assembly 3 illustrated in FIG. 1. The visual indicator 15 is an adhesive label pressed onto the top 10 of the inner container 5. The label is printed with a temperature sensitive ink that changes color (or otherwise provides a change in appearance) at a given predetermined temperature. When the container and its contents are heated to this temperature, the ink changes color to show the user that the contents of the can are ready for use. The color change is one time only—the ink changes when the predetermined temperature is reached, but does not change back to its original color when the can cools back below its predetermined transition temperature. When the user looks at the indicator and sees it in its original color or appearance, the user can be confident that the assembly 3 has not been activated—whether by accident or intentional tampering—and that the assembly thus remains ready for use. When the user activates the assembly, the user can watch the indicator until it changes color, at which time the user will know that the food or beverage is hot and ready for use.

Other indicators may be used in place of the color-change label described here in connection with a preferred embodiment. An alternative visual indicator might use a heat-sensitive ink that would become visible (or change from visible to invisible) at the predetermined temperature. Still other indicators might change their shape or some other condition to indicate to the products user that the product had been activated at some time in the past or that the product is now ready for use.

Figure 3:
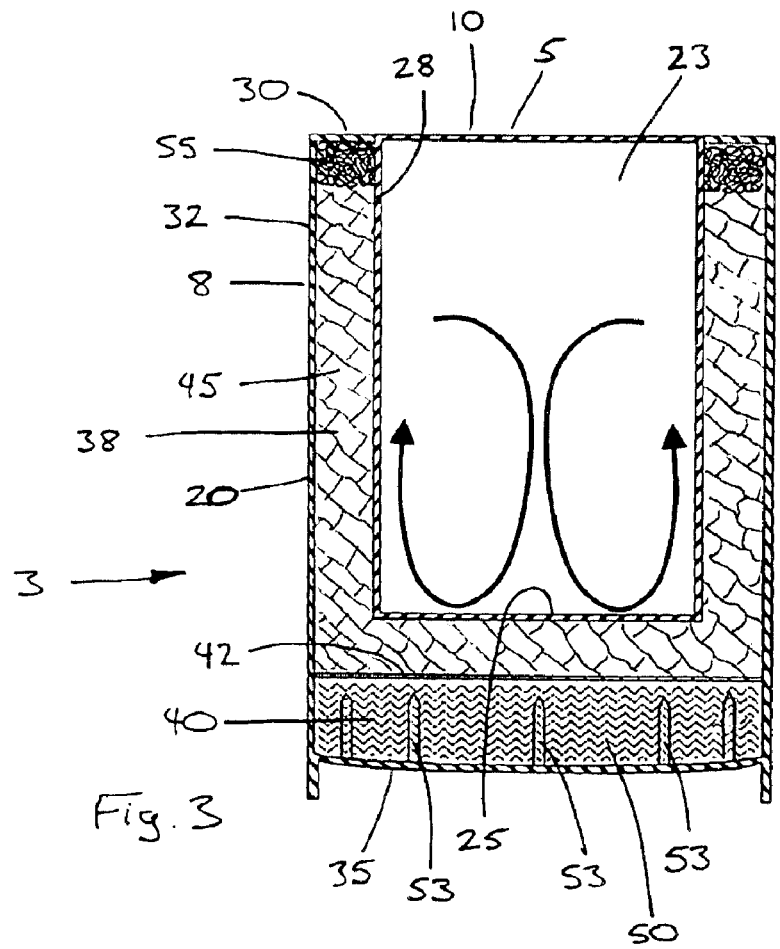
FIG. 3 is a side section view of the container assembly of FIGS. 1 and 2.

FIG. 3 is a side section view showing internal details of the container assembly 3. The food, drink, or other contents 23 are held inside the sealed inner container 5. The inner container can be a custom container or a conventional standard-sized can. The food, drink, or other contents can, if desired, be placed inside the can as usual at a canning factory and delivered to another location for assembly of the other elements around the can, or the food can be packaged and the entire assembly assembled at one location. Preferred embodiments use standard cans, which is advantageous because it allows for a great variety of canned foods and drinks to be assembled into a self-heating assembly without any special tooling or manufacturing on the part of the food manufacturers. Voluntary can size standards are developed and published, for example, by the Can Manufacturers Institute Can Standards Working Group.

A food producer may produce many individual cans of a product sealed inside standard size cans. Some of these units may be designated for conventional labeling and delivery for sale to consumers. Other identical units can be designated for incorporation in a temperature-change assembly of the type described here. Those assemblies might be constructed at the canning facility or another location where a food or beverage is packaged inside the containers, or delivered to another location for further assembly and later delivery for sale to consumers. Use of standard containers in these assemblies means that no significant retooling or other manufacturing changes are required of a food producer in order to have their canned products incorporated in assemblies like those described in this document.

A standard cylindrical food can 5 like that shown in FIG. 3 comprises a top 10 and a bottom 25 with a cylindrical container wall 28 between them. Conventional cans are usually steel, aluminum, or similar materials that are—conveniently for this invention—very effective heat conductors. The container's contents 23 can be a food, a drink, or another item intended for use at a temperature above its usual storage temperature.

The outer jacket 8 surrounds the inner can 5. The jacket in this embodiment (for a cylindrical can) comprises an annular jacket top ring 30, a cylindrical jacket body 32, and a jacket bottom 35. The jacket parts can be formed of an inexpensive ordinary plastic material. There is no direct contact between the plastic and the food 23 inside the can 5 so special food-grade plastics are not required. The material that forms the jacket parts should preferably have a relatively low thermal conductivity—lower in particular than the thermal conductivity of the material of the inner can 5.

A space is defined inside the jacket 8 between the inside of the jacket and the outside of the can 5. This space includes a first internal volume 38 and a second internal volume 40, with an intermediary barrier 42 between them.

The first internal volume 38 holds a first reagent 45, the second internal volume 40 holds a second reagent 50, and the barrier 42 separates the two. In a preferred embodiment the first reagent is granular calcium oxide and the second reagent is ordinary liquid water. The barrier can be a thin, breakable membrane such as a metal foil or a plastic film. Spikes or penetrators 53 are provided on the jacket bottom 35, with the spikes pointing inward toward the barrier membrane reagent separator 42.

To heat the contents 23 of the can 5, the user inverts the assembly 3 so that it rests on the can's top 10 and the jacket top ring 30. The jacket bottom 35 is flexible enough so that the user can force the spikes 53 through the membrane 42 by pressing down on the middle of the flexible jacket bottom. When the user removes the pressure, the flexible jacket bottom returns to its original position, withdrawing the spikes and leaving several spaced-apart holes in the membrane. One such hole is produced by each spike, and the holes are spaced-apart in a pattern corresponding to the spikes' configuration.

The liquid water second reagent 50 runs or drips out of the second internal volume 40 and into the calcium oxide first reagent 45 in the first internal volume 38. An exothermic reaction ensues as the water percolates downward through the granular calcium oxide. The heat of this reaction is conducted preferentially through the bottom 25 and the wall 28 of the can, which—being metal—conduct heat much better than the plastic of the outer jacket 8.

After a short time—after the liquid water second reagent 50 has permeated sufficiently through the calcium oxide first reagent 40—the user may flip the assembly 3 back into the upright configuration shown in FIG. 3. The reagent mixture will continue to produce heat and warm the food for a considerable time until the reaction is complete. During this time, convection currents (indicated by the arrows in FIG. 3) are generated in the food or drink 23, which helps to distribute the heat within the product so that the product is heated in a controlled manner with the food or drink brought to a relatively uniform temperature throughout the volume of the can 5.

The exothermic reaction between the calcium oxide 45 and the liquid water 50 is a fairly strong one. Temperatures within the mixture can reach 400 degrees Fahrenheit (200 degrees Celsius) or more, and a significant quantity of steam is generated.

A steam condenser 55 is provided in the first internal volume 38 around the can 5 near the top of the jacket 8. In a preferred embodiment, the steam condenser is a quantity of fairly loosely packed steel wool. Steel wool is an efficient conductor of heat, with a high surface area relative to its volume. Hot steam that moves upward from the reagent mixture is cooled rapidly as it comes into contact with and condenses onto the steel wool. Significant heat is released, especially in changing the steam from vapor to liquid water. This heat is transferred efficiently from the highly conductive steel wool into the also highly conductive metal wall 28 of the can 5. The high surface area of the steel wool provides a large effective surface area for condensation of the steam. The liquid water condensate is then available to drip back down into the calcium oxide 45 to further the ongoing exothermic reaction. The reaction can continue for a considerable time, maintaining the product at an appropriate temperature long after the initial heating.

The steam condenser might also be placed inside the second internal volume, when the product is activated steam fills the entire interior space comprising the first and second internal volumes, so that a steam condenser in the second internal volume might also be effective in condensing excess steam generated by the reaction.

In some cases, it may be desirable to mix an inert material (one that does not contribute to the temperature-change reaction, with the first reagent 45 in the first internal volume 38. This can be done to moderate the reaction to control the rate of the reaction and the rate and amount of heat generation.

The reaction rate may also be moderated by providing a second quantity of the liquid reagent inside the first internal volume inside a plastic bag with an appropriate melting point. When the liquid reagent mixes with the solid reagent, the temperature will rise inside the jacket body. At some point, the temperature will exceed the melting point of the bag that contains the second quantity of the liquid reagent, which will then be released into the first reagent to contribute further to the reaction.

If desired, an appropriate substance may be added to the liquid reagent to lower its freezing point to protect the liquid reagent against freezing as the assembly is transported or stored. Common sodium chloride salt is an inexpensive substance that can lower the freezing temperature of liquid water substantially.

A variety of different reagent combinations might be used in different embodiments. The first reagent may be a combination of an acidic anhydride or salt and a basic anhydrade or salt. Adding water as a second reagent to such a first reagent mixture will produce heat and an acid/base mixture. The neutralization reaction between the acid and the base produces additional heat, and a safe, neutral, easily disposable end product.

Possible reagent mixtures include calcium oxide (CaO) in combination with phosphorous pentoxide ($P_2O_5$); calcium oxide in combination with aluminum chloride ($AlCl_3$), calcium oxide in combination with oxalic acid ($H_2C_2O_4$), and calcium oxide in combination with magnesium chloride ($MgCl_2$). Other reagent mixes are possible as well, and an inert material might be added to such a first reagent mix, if desired, to control the rate and degree of heat produced in the reaction. Mixture proportions might include, for example, between 100–125 grams of calcium oxide, between 0–30 grams of oxalic acid, and between 0–15 grams of inert mineral oil.

Although the preferred embodiment described here is intended primarily for heating a food or beverage, other applications are also contemplated. There are, for example, certain cosmetic, medical, pharmaceutical, therapeutic, or sports appliances—bandages, wraps, treatments for soreness or stiffness, and the like—that are intended to be applied to a user's body at temperatures above room temperature. Such products could be enclosed inside a container in an assembly like that described here, for activation and application at the desired elevated temperatures, even at locations where more conventional heating equipment is not available. Food products can include foods and beverages, in single servings or multiple-portions, including platoon-size meals for military or similar use in the field. Foods may obviously include entrees, side dishes, baby foods or formulas, pet foods, or any other food or beverage for which heating or cooling might be desired.

Moreover, although such an assembly will commonly be used to heat a product from room temperature to well above room temperature, the use of the invention is not so limited. Some products may best be stored, even in a sealed container, in a refrigerator or freezer at a temperature well below room temperature. In that case, an assembly of this type might be used to quickly bring the product up to room temperature for use, or in any event up to a temperature above the product's normal storage temperature.

Finally, although the invention is embodied here in a self-heating assembly that uses an exothermic reaction to deliver heat to the product, other reagents could be used that would, upon mixing, initiate an endothermic reaction to extract heat from the container and thereby cool a product contained inside it. Cold beer or wine, water, juices, or soft drinks could be delivered at locations away from conventional refrigeration and without the need for heavy and space-consuming ice or freezer appliances. There are also sports wraps and similar therapies—such as those intended to treat minor sprains and reduce swelling—that are best applied at temperatures well below normal temperature.

These products and others—including but by no means limited to food entrees and side dishes including baby food or formulas, and beverages such as beer, wine, coffee, tea, cocoa, or hot apple cider, and non-food products including hair dyes, hot oil hair treatments, self-heating beauty wax treatments, surgical tools, and other products—might be delivered for convenient use inside a self-contained temperature-change container according to the invention.

FIGS. 4–9 illustrate process steps in the manufacturing of a container assembly that embodies the invention. FIG. 4 illustrates the attachment of the annular jacket top ring 30 around the edge of the top 10 of the inner container metal can 5. The top ring is placed generally flush with the top edge of the can, and secured to the can by an adhesive or by any other suitable method. If desired, the food, drink or other contents can be put into the can and the can sealed at an ordinary canning facility, which may be at a location other than that at which the finished product is assembled. Standard sealed cans identical to those usually sold to consumers can be delivered to the assembly location for inclusion in the final product.

FIG. 5 illustrates the attachment of the outer jacket body 32 to the top ring 30. After the top ring is fixed at the top 10 of the can 5, the can and the top ring are turned top down so that the outer jacket body can be fixed around the top ring. The jacket body can be secured to the top ring by any suitable method, including adhesive fixing, or heat, sonic, or spin welding.

FIG. 6 depicts a filling of the steel wool 55 and the calcium oxide 45 (in that order) into the interior of the jacket body 32 around the outside of the can 5. The calcium oxide is filled as shown in FIG. 6 to a depth sufficient to cover the inverted body 25 of the can.

FIG. 7 shows the attachment of the aluminum metal foil or plastic film membrane 42 over the top of the calcium oxide first reagent 45. As the partial enlargement portion of FIG. 7 illustrates, the inner wall of the jacket body 32 has a stepped profile at the location where the membrane 42 is to be anchored. The calcium oxide is filed into the jacket body to a height near the step 57, so that the membrane is installed close to the calcium oxide reagent. The membrane can be attached to the inner jacket body wall by any suitable method, including thermal or press welding.

Figure 8:
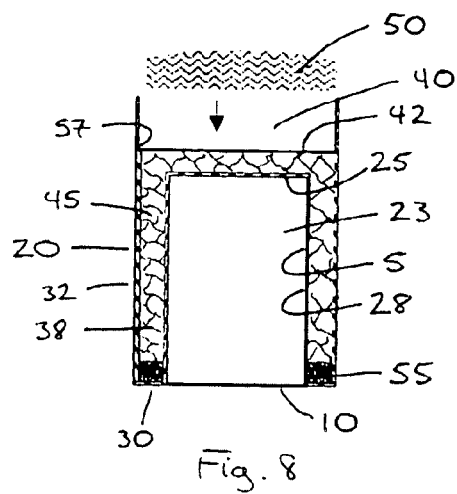
FIG. 8 depicts the placement of a second reagent into the jacket body of FIGS. 4–7.

After the membrane barrier 42 is in place over the calcium oxide first reagent 45, the liquid water second reagent 50 is placed into the jacket body 32 over the membrane, as FIG. 8 indicates.

Figure 9:
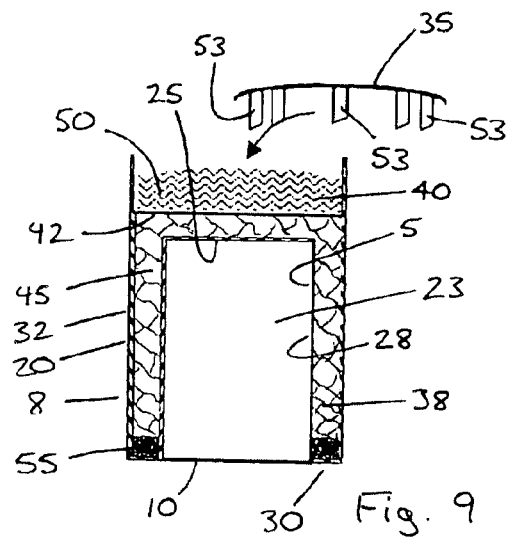
FIG. 9 illustrates the installation of a jacket bottom onto the jacket body of FIGS. 4–8.

FIG. 9 depicts the installation of the jacket bottom 35 inside the jacket body 32. The jacket bottom is positioned so that the spikes 53 do not pierce the membrane 42, but close enough so that they will pierce the membrane when the user presses the jacket bottom inward toward the membrane. The jacket bottom can be fixed to the jacket body by any suitable method, including adhesive fixation, or thermal-, sonic-, or spin-welding.

Fixation of the jacket bottom 35 to the jacket body 32 completes this stage of the assembly. Further steps may involve applying labels to the jacket body. If desired, one or more insulating layers can be applied between the jacket body and an outer layer, to further inhibit transfer of heat to the outside of the assembly.

Several characteristics are desired for a self-heating assembly of the type described above. First, it is desirable that the quantity of heat generated in the exothermic reaction be sufficient to heat the food to the desired temperature, and to hold the food at an appropriate temperature for an appreciable period of time. Second, the reaction should be vigorous enough to heat the food quickly to the desired temperature, so that the user does not have to wait too long between his activation of the assembly and the time when the food is heated and ready for consumption. Third, it is vital that the product be safe. There should be no danger of any overpressure that might rupture the jacket; nor should the outer surfaces of the jacket become too hot to touch or for the user to hold comfortably in his or her bare hands. Finally, the product should not be prone to accidental activation, and the user should be assured that no such premature activation has occurred. The preferred embodiment described above includes several features that contribute to the achievement of these goals.

Figure 10:
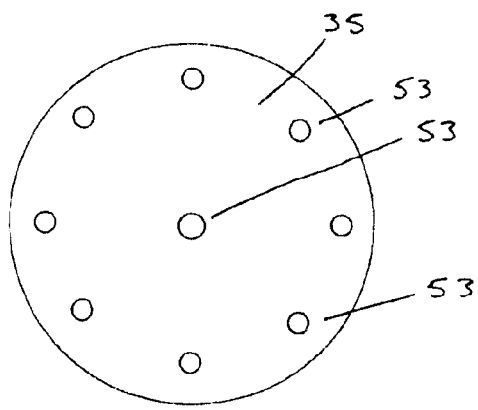
FIG. 10 is a plan view showing the arrangement of penetrating spikes on the jacket bottom of FIG. 9.
Figure 11:
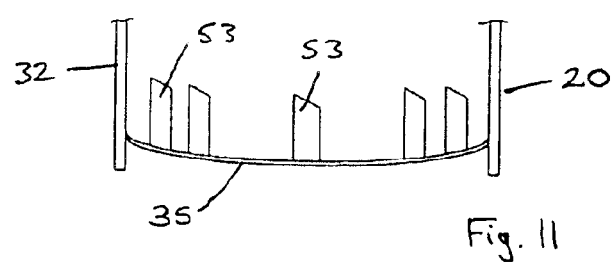
FIG. 11 is a side view showing the arrangement of the penetrating spikes of FIG. 10.

FIG. 10 is a plan view illustrating a configuration of the spikes or membrane penetrators 53 on the jacket bottom 35. FIG. 11 is a corresponding side section view of the spikes on the jacket body, and a lower portion of the jacket body 32. Multiple spikes are arrayed across the surface of the jacket bottom. In this embodiment, nine spikes cover substantially the entire surface of the jacket bottom, opposite substantially the entire surface of the membrane.

When the jacket bottom 35 is flexed toward the membrane, the spikes 53 form a pattern of relatively small holes distributed over the substantially the entire area of the membrane, one hole at the location of each spike. This allows the liquid water first reagent to drip in a controlled way into the calcium oxide second reagent. The water flow is distributed across the surface of the calcium oxide rather than localized at a single point, and the water drips onto the calcium oxide through multiple small holes rather than simply flooding into it through a single, large rupture in the membrane. This allows the reaction to proceed fairly rapidly while avoiding local overheating or overpressure at any single place within the calcium oxide reagent. It will generally be desirable to provide at least three spaced-apart spikes to penetrate the membrane, and five or more spikes will often be preferred.

The steel wool steam condenser 55 at the top of the volume 38 that contains the calcium oxide 45 helps to moderate overproduction of steam in the reaction. Steam generated in the reaction can condense efficiently on the large surface area of the steel wool filaments. Heat released by this condensation is transmitted efficiently from the highly conductive steel wool into the (also highly conductive) outer surface of the metal can 5.

To heat the food efficiently while maintaining the outside of the assembly 3 at a comfortable temperature, it is desirable that the heat generated in the reaction be transmitted highly preferentially into the can 5, rather than through the material of the jacket 8 to the outside of the assembly. This is achieved to a significant extent due to the different thermal conductivities of the different materials. The metal of the can conducts heat much more readily than either the plastic of the jacket or any thermal insulator that might be used between the jacket and the steel wool.

Figure 12:
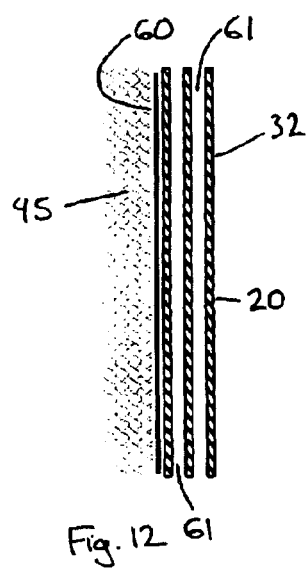
FIG. 12 illustrates a first layered configuration for the outer wall of a container assembly that embodies the invention.

If desired, heat flow to the exterior of the assembly 3 can be further limited by applying appropriate insulators to the interior or exterior of the plastic jacket 8, or within the material of the jacket itself. FIG. 12 shows one such application. In this embodiment, a first insulator paper layer 60 is applied to the inner side of the jacket body 32, between the calcium oxide and the jacket body. In this embodiment, moreover, air pockets 61 are present between multiple layers that jointly comprise the jacket body. These air pockets are maintained by ribs, corrugations, or similar structure (not shown) between the multiple layers of the jacket body. The internal paper layer provides a first degree of insulation, and closed pockets of trapped air such as those within the jacket body are highly effective insulators.

Figure 13:
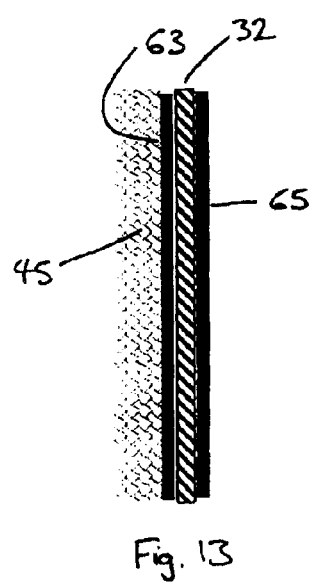
FIG. 13 shows a second layered configuration for the outer wall of a container assembly that embodies the invention.

Another configuration of layered insulators is shown in FIG. 13. This embodiment includes an inner layer 63 of molded or pressed fiber such as that commonly used in pressed egg containers. This inner layer is applied to the inside of the jacket body 32. A thin (3 millimeter) layer 65 of expanded polystyrene foam (e.g., Styrofoam®) is applied over the jacket body. The Styrofoam® layer is an effective insulator with a surface that is easily and comfortably gripped and held by a user of the product. The Styrofoam® layer is also appropriate for the printing of permanent, colorful, and attractive visual designs, and is thus well-suited for use as the product's identifying label.

Figure 14:
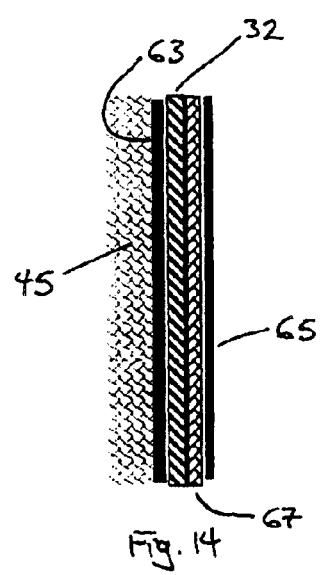
FIG. 14 depicts a third layered configuration for the outer wall of a container assembly that embodies the invention.

Still another layered configuration is shown in FIG. 14. This embodiment includes a molded or pressed fiber layer 63 applied to the inside of the jacket body 32 as in the prior configuration, and a Styrofoam® layer 65 applied to the outside of the assembly. This embodiment includes an additional layer of corrugated cardboard 67 between the plastic of the jacket body and the Styrofoam®. The corrugated cardboard defines channels or voids in which air pockets are held—and these air pockets are of course highly effective insulators.

Figure 15:
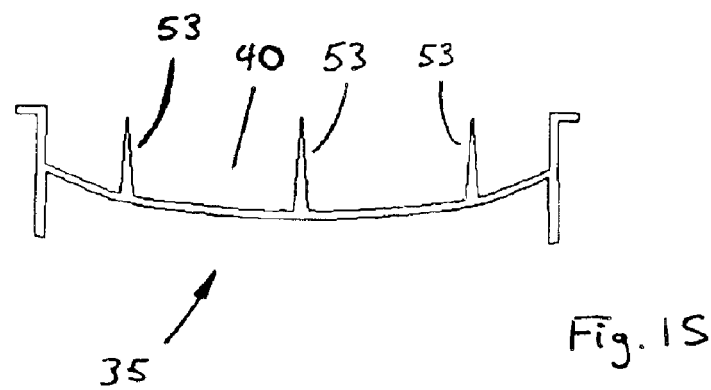
FIG. 15 shows a jacket bottom member that forms a part of an alternative preferred embodiment of the invention.
Figure 16:
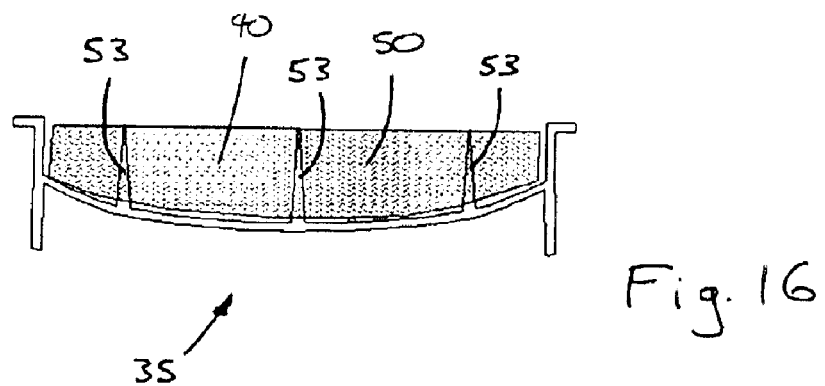
FIG. 16 shows a liquid reagent filled into the jacket bottom member of FIG. 15.
Figure 17:
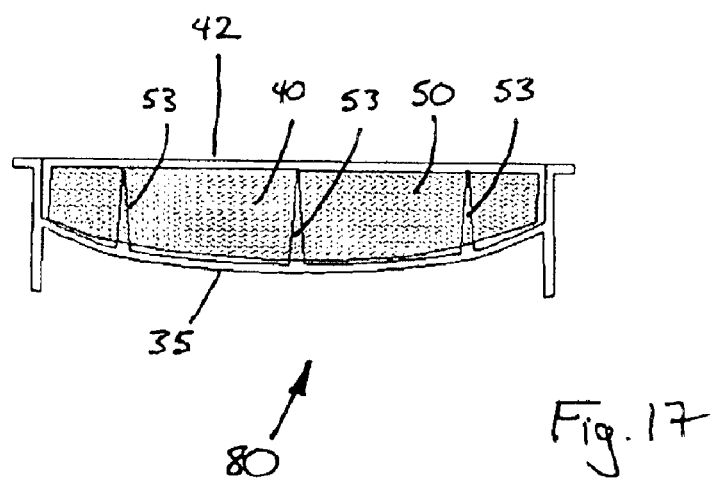
FIG. 17 depicts a membrane applied to the jacket bottom member of FIG. 15 over the liquid reagent shown in FIG. 16.

An alternative preferred construction is illustrated in FIGS. 15–24. FIG. 15 shows a cup-shaped jacket bottom member 35 that carries a number of pointed penetrators or spikes 53. Water or another liquid reagent 50 is filled into the internal volume 40 in the bottom member's upward-facing cup as shown in FIG. 16. The film or foil membrane barrier 42 is then fastened over the spikes and the internal volume as shown in FIG. 17 to hold the liquid reagent inside the cup. The membrane is secured to the bottom member by an adhesive, heat-sealing, ultrasonic welding or any other suitable means. Sealing the membrane over the liquid reagent packages the reagent inside a self-contained activation subassembly 80.

Figure 18:
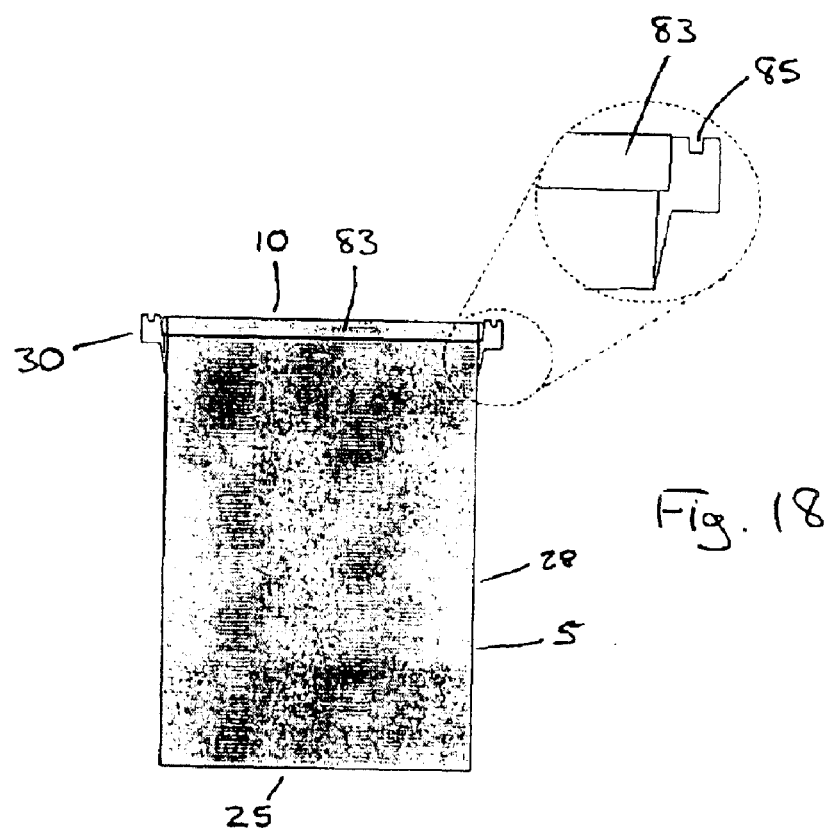
FIG. 18 illustrates the installation of a thin-profile jacket top ring around the top of an inner container.

FIG. 18 illustrates the installation of a thin-profile jacket top ring 30 around the top 10 of the inner container 5. The top ring is slipped from the bottom of the can upward into engagement with the lower edge of the rim 83 near the top of the can. The normal, unstressed inner diameter of this top ring is slightly less than the outer diameter of the can. A watertight, airtight seal is thus formed between the top ring and the can wall 28 when the ring is slipped onto the can.

Figure 19:
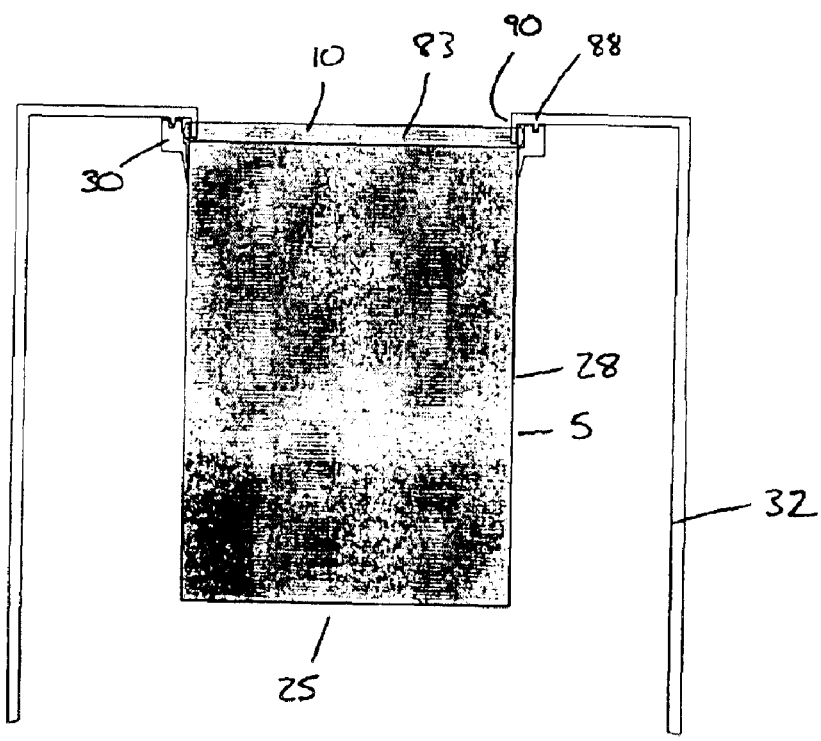
FIG. 19 shows the installation of a jacket body member to the jacket top ring of FIG. 18.

As the detail view in FIG. 18 illustrates, this top ring 30 includes a notch 85 around the upper surface of the top ring. FIG. 19 shows the installation of a jacket body member 32 to the top ring. This jacket body member includes a notch engaging ring, configured to engage with the top ring's notch, and a can rim engaging ring 90, configured to engage the inside of the rim 83 at the top of the can 5. The jacket body member is fixed to the top ring by ultrasonic welding, spin welding, or any other suitable method.

Figure 20:
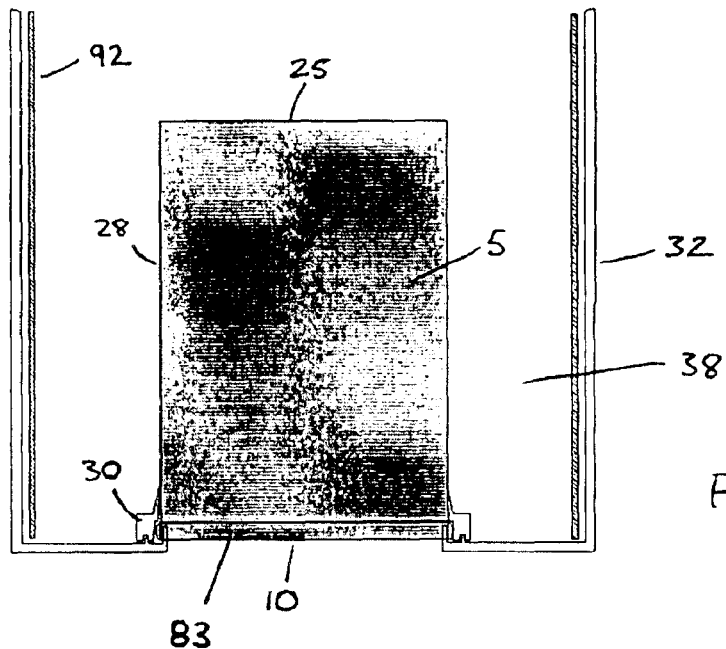
FIG. 20 depicts the installation of a thermal insulator inside the jacket body member of FIG. 19.

After the jacket body member 32 is fixed to the top ring 30, the resulting can/jacket body subassembly is inverted as shown in FIG. 20. A thermal insulator 92 is then placed inside the internal volume 38 between the can 5 and the jacket body member 32, near the inner wall of the jacket body member. The thermal insulator can be a corrugated cardboard or pressed paper material, a reflective foil, a reflective paint applied to the jacket body's inner wall, or any other suitable thermal insulator.

Figure 21:
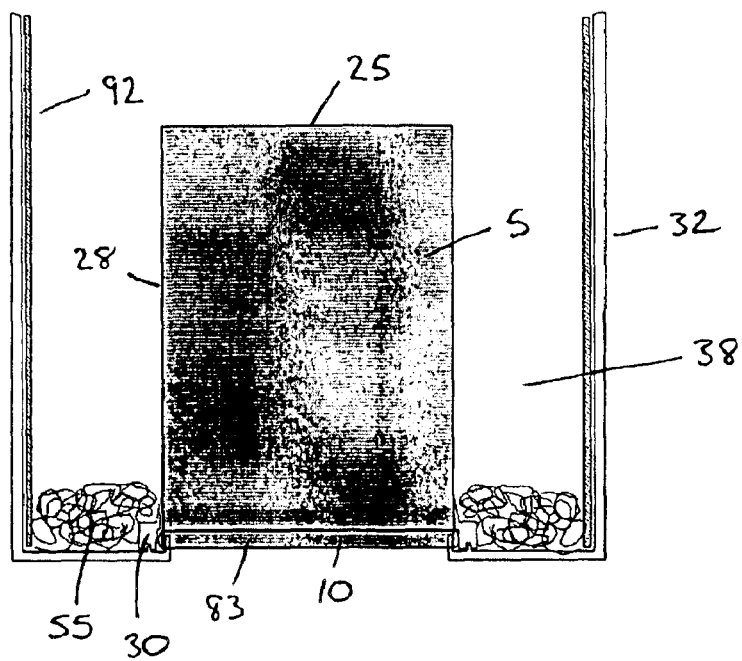
FIG. 21 illustrates the placement of a steam condenser inside the jacket body member shown in FIGS. 19 and 20.

FIG. 21 illustrates the placement of the steel wool steam condenser 55 inside the internal volume 38 around the top 10

Figure 22:
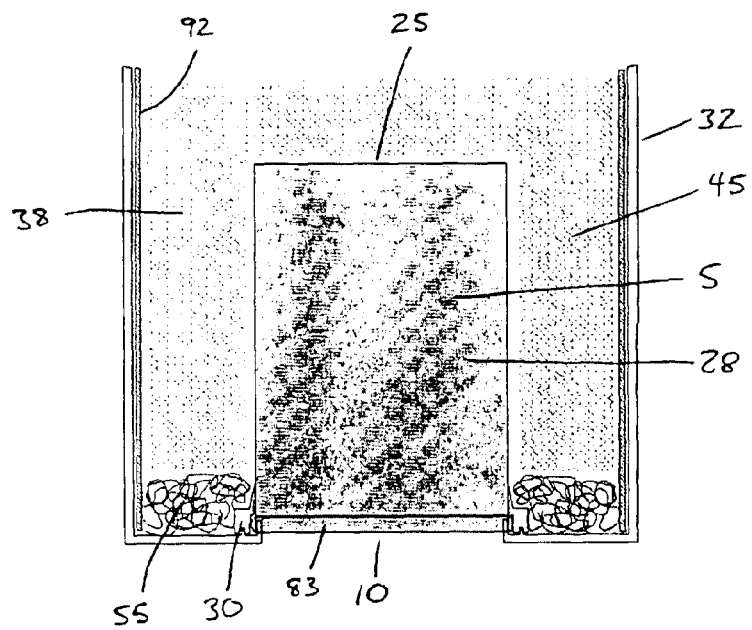
FIG. 22 illustrates a second reagent filled inside the jacket body member of FIGS. 19–21.

(shown inverted in this figure) of the can 5. As FIG. 22 shows, calcium oxide 50 or another suitable reagent is then filled into the internal volume over the steam condenser to a depth that covers the inverted bottom 25 of the can.

Figure 23:
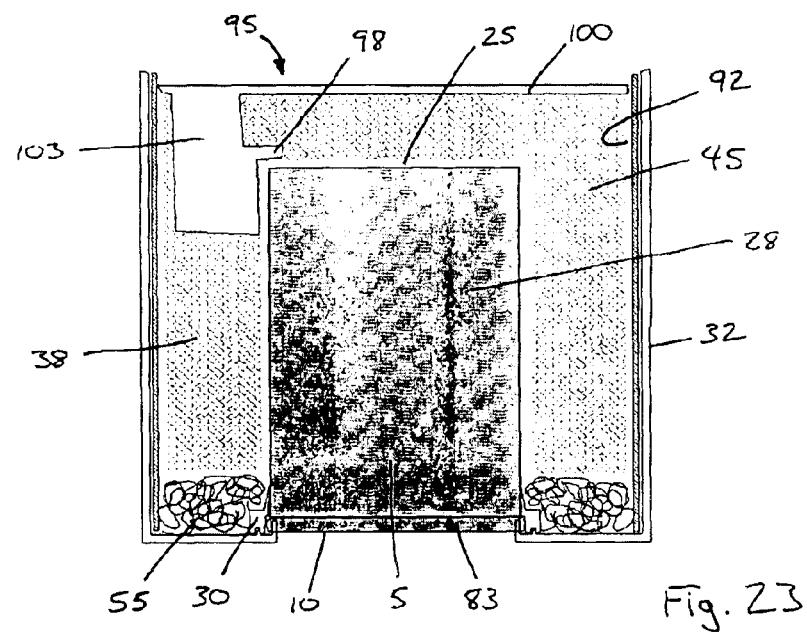
FIG. 23 depicts the placement of a can support inside the jacket body member of FIGS. 19–22.

Then, as indicated in FIG. 23, a can support 95 can be placed inside the jacket body member 32 to support the can. The can support includes a lip 98, which engages with the bottom 25 of the can 5, a can support base 100, and a support column 95 to support the lip over the base. The exact configuration of the can support can vary considerably. It may include multiple support columns, for example, and the base can be a simple, thin bar, a circular member running around the circumference of the outer jacket, or any other suitable shape so long as sufficient open space is left to allow the liquid reagent to drip down into the first reagent inside the jacket body member. The can support is in fact optional, and may not be included at all in some preferred embodiments.

Figure 24:
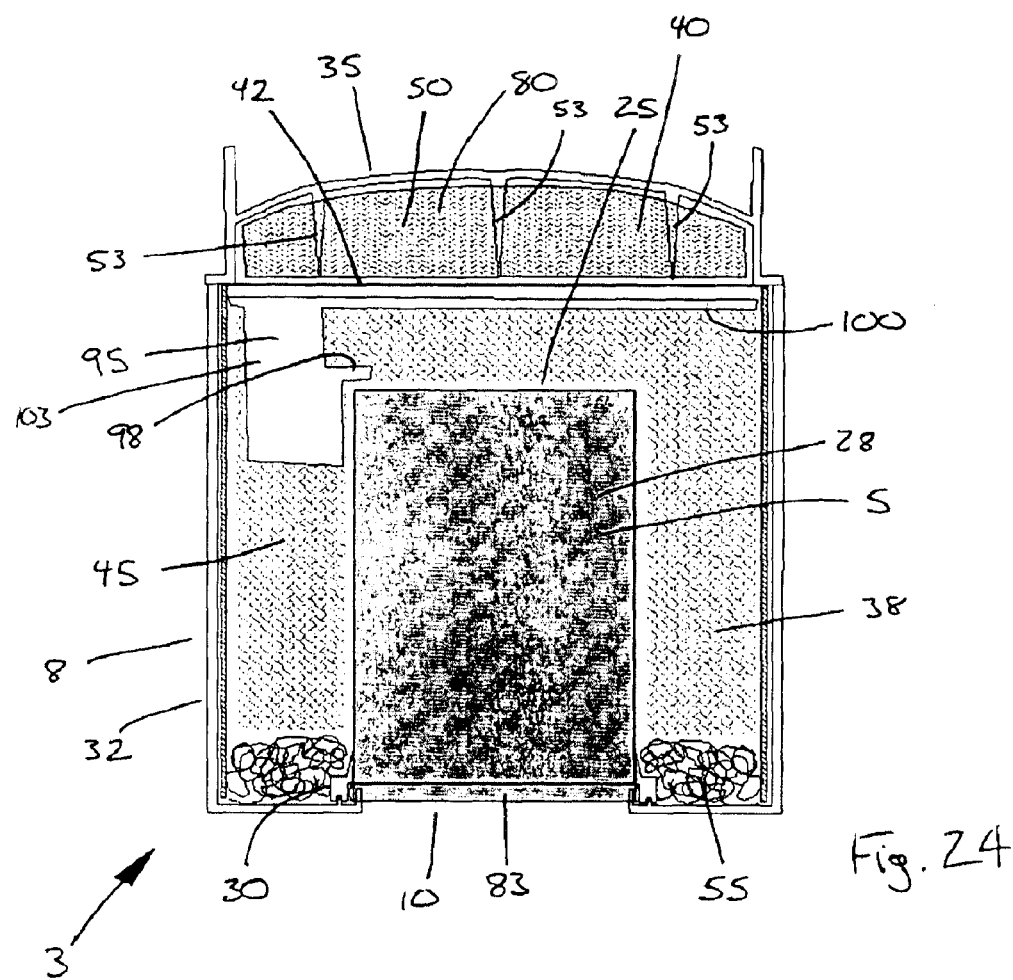
FIG. 24 shows the installation of the subassembly of FIGS. 15–17 to the subassembly of FIGS. 18–23 to provide a self-contained assembly embodying the invention.

The assembly is completed as illustrated in FIG. 24 by installing the activation subassembly 80—comprising the flexible bottom member 35, the barrier membrane 42, and the liquid water second reagent 50—to the bottom of the jacket body member 38 to seal the calcium oxide first reagent 45 inside the jacket. Additional insulation layers or product packaging can be applied over the outside of the jacket body if desired. This is assembly is used in the same way as the previous one, by flexing the jacket bottom to force the spikes 53 through the barrier. This leaves a pattern of holes through the barrier—one hole corresponding to each penetrator, and the liquid second reagent 50 can then move through the holes and into contact with the first reagent 45 to initiate the temperature change reaction.

Figure 25:
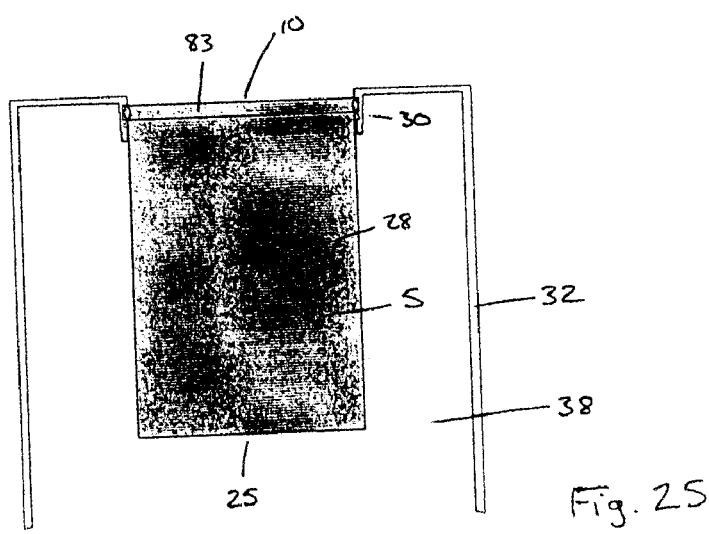
FIG. 25 depicts an alternative construction in which a jacket body member and jacket top ring are formed integral with one another as a single piece.
Figure 26:
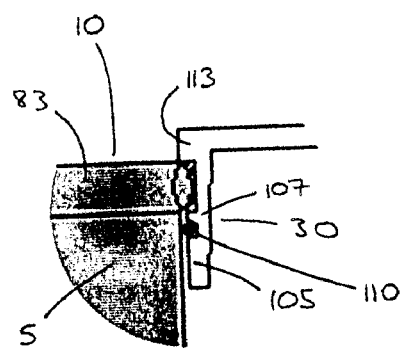
FIG. 26 is an enlarged detail view showing a region of top ring of FIG. 25.

FIGS. 25 and 26 illustrate yet another preferred embodiment. FIG. 25 shows a jacket configuration in which the jacket body 32 is formed integral with the jacket top ring 30, rather than as separate pieces joined together as in the previous figures. FIG. 26 is a detail view showing the region where the top ring of the integral jacket embodiment contacts the upper edge of the can 5.

In this embodiment, as in the previous one, the jacket top ring 30 is slipped over the outside of the can 5. Referring particularly to the detail view of FIG. 26, the top ring includes lower seal retainer 105 and an upper seal retainer 107. A seal 110 is retained in contact with the side of the can between these two seal retainers. The seal may be an elastomeric or otherwise flexible O-ring, a hardening liquid seal such as a hot liquid glue or a liquid elastomer that hardens upon cooling, or any other suitable material. The rim 83 of the can is gripped between the upper seal retainer 105 and an upper can rim retainer 113. This embodiment and its assembly are otherwise generally similar to the other embodiments described previously. The reagents, principles of operation, and applications are generally the same.

Figure 27:
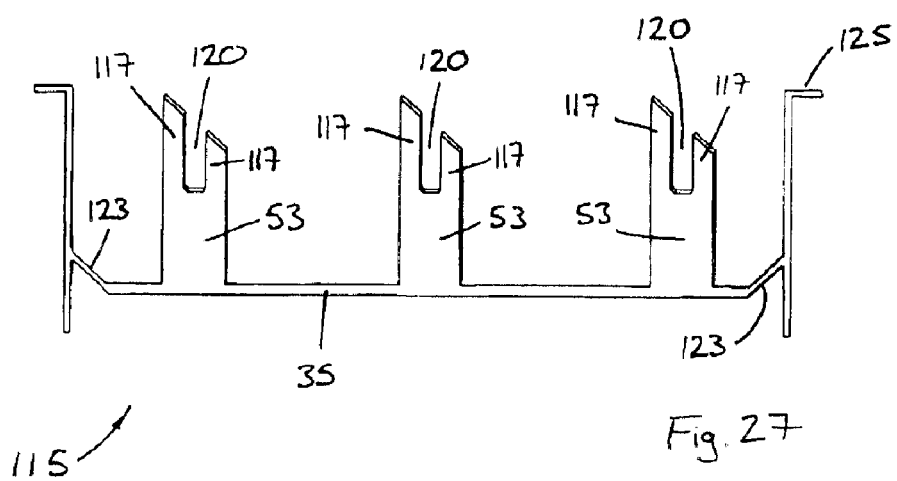
FIG. 27 is a side section view of an alternative activation assembly for use with a self-contained temperature-change assembly according to the invention.

FIG. 27 is a side section view of an alternative actuator 115 for use in temperature-change assemblies of the type described here. This actuator, like those described above, can be incorporated as a jacket bottom 35 in a jacket assembly surrounding an inner container. As in the other jacket bottoms, this one includes several spikes, or penetrators 53 on a movable member disposed opposite a foil, film, or other membrane-like barrier. Each of the spikes in this embodiment includes two penetrating spike tips 117 with a notch 120 between them. The spike tips penetrate and tear the membrane. The notches provide open flow paths through the resulting holes for the liquid second reagent to flow through the membrane into contact with the solid first reagent.

The embodiment of FIG. 27 differs slightly from the embodiments described above. This embodiment includes a flexible "hinge" 123 around the rim of the jacket bottom 35. To operate an assembly that includes this actuator 115, the user presses the jacket bottom on the side opposite the spikes 53. The hinged rim 123 is flexible enough to allow the spike tips 117 through the membrane. In this case, though, when the jacket bottom has moved on the hinge, it does not move back into the original configuration shown in the drawing when the pressure is removed. The jacket bottom, in other words, does not flip back outward across the rim hinge. This provides the user with a way of knowing whether or not a given assembly has been activated previously. If the hinge rim is flipped inward, the jacket bottom has been pressed. If not, the assembly remains ready for use.

This embodiment further includes an outer rim surface 125, which provides a convenient location for anchoring a membrane to the actuator 115, or for securing the actuator to other elements of the overall assembly.

Reagents used in prior temperature-change assemblies have been subject to degradation over time. Calcium oxide, for example, is very hygroscopic and its absorption of water from the atmosphere might limit the shelf life of the product. In the embodiments described below, the solid first reagent is packaged inside a vacuum-sealed plastic bag having a virtually zero water vapor transmission rate.

Figure 28:
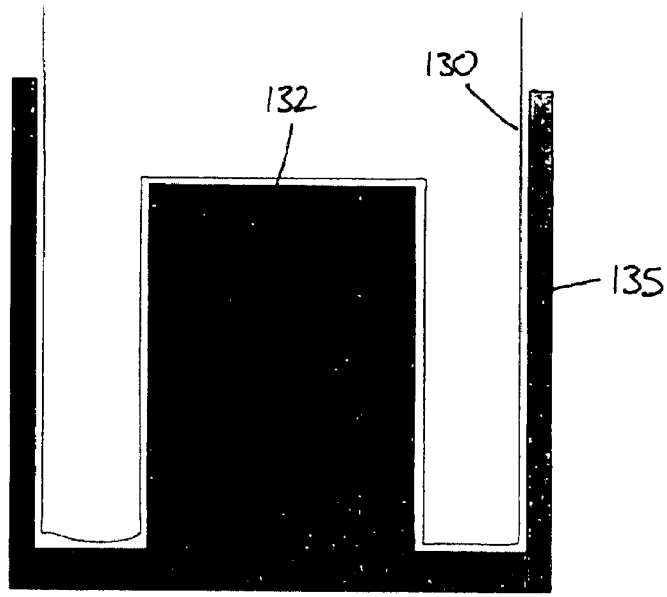
FIG. 28 is a side section view of a fixture and a thin-walled plastic bag used in an alternative embodiment of the invention.

FIG. 28 illustrates a fixture 128 for filling the first reagent into an open plastic bag 130. The fixture includes a cylindrical central support 132 of a size corresponding at least generally to the size of the inner container of the final assembly. The fixture also includes an outer wall 135 around the central support; the outer wall is sized to correspond to the size of the outer jacket in the final assembly. An open bag is placed inside the outer wall and over the central support as shown in FIG. 28.

Figure 29:
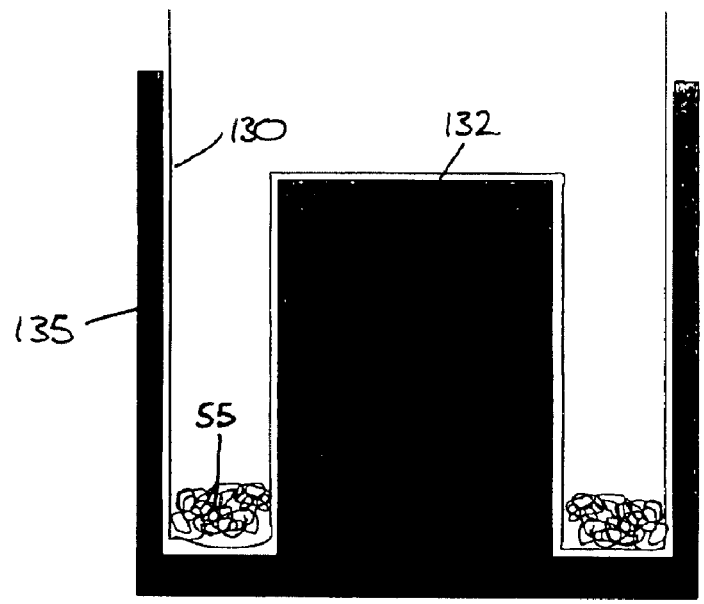
FIG. 29 is a side section view showing a steam condenser placed inside the thin-walled plastic bag of FIG. 28.
Figure 30:
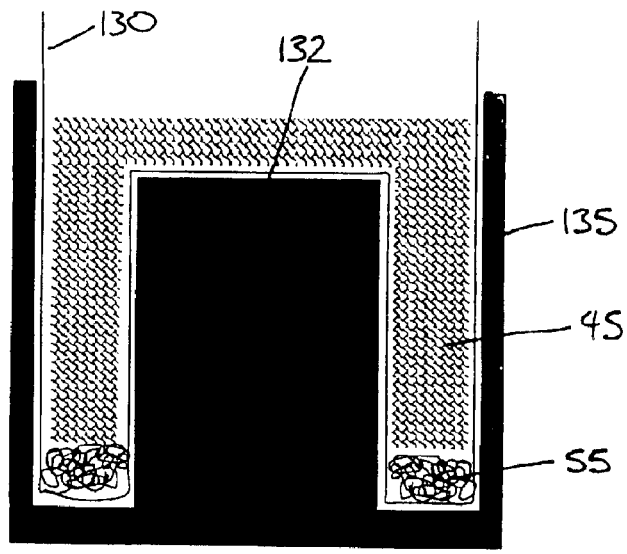
FIG. 30 is a side section view showing a first reagent filed into the thin-walled plastic bag over the steam condenser shown in FIG. 29.
Figure 31:
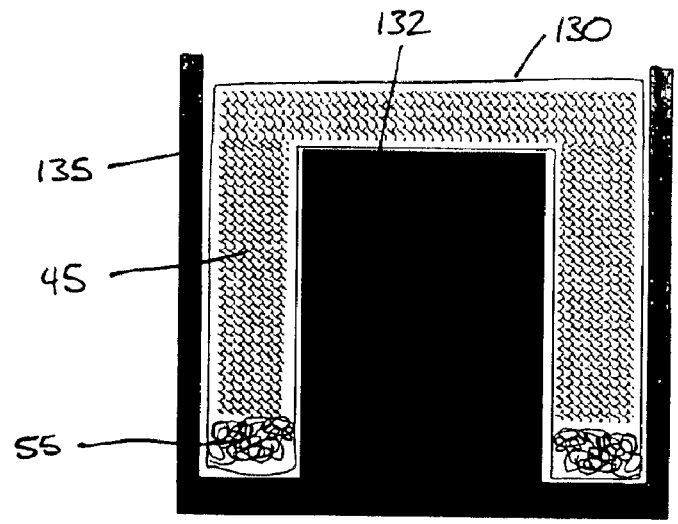
FIG. 31 is a side section view illustrating a step of vacuum sealing the thin-walled plastic bag of FIG. 30, with the first reagent and the steam condenser sealed inside.
Figure 32:
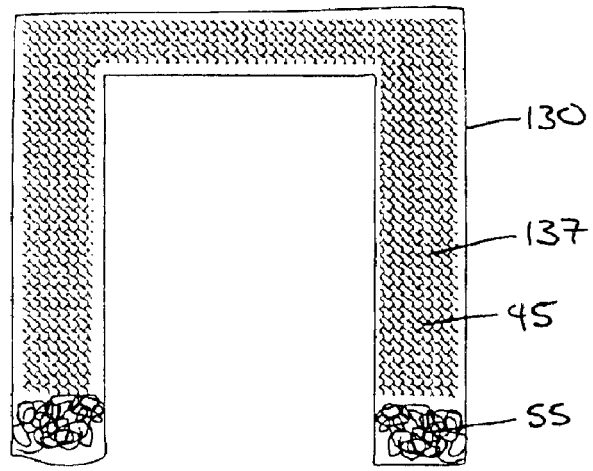
FIG. 32 shows a reagent subassembly constructed according to the steps illustrated in FIGS. 28–31.

The steel wool steam condenser 55 is then filled into the plastic bag 130 to a desired depth appropriate for the final assembly, as illustrated in FIG. 29. The first reagent is filled into the bag over the steam condenser, as shown in FIG. 30. The open top of the bag is then vacuum-sealed as shown in FIG. 31. Sealing the bag provides a completely vapor tight reagent subassembly 137, which is shown removed from the support figure in FIG. 32.

Figure 33:
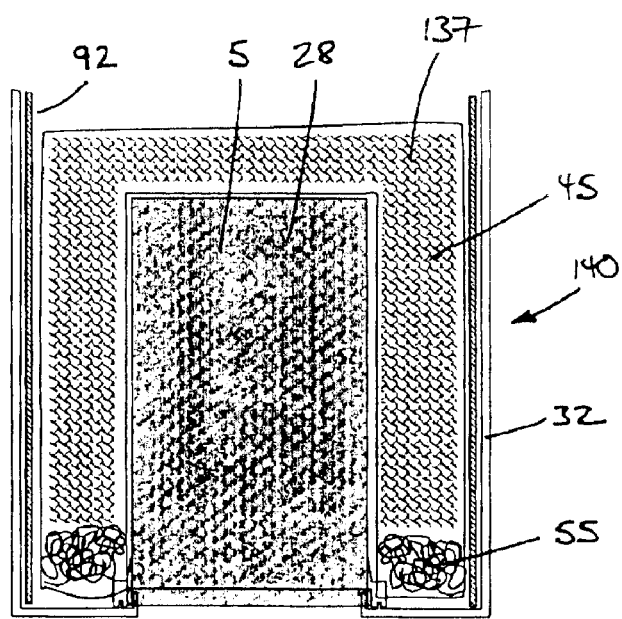
FIG. 33 shown the reagent subassembly of FIG. 32 placed inside an outer jacket subassembly.

FIG. 33 illustrates the placement of the filled solid reagent subassembly 137 (carrying the steam condenser 55) into an insulated outer jacket subassembly 140. The outer jacket subassembly and its construction may be substantially identical to that of the assembly described above in connection with FIGS. 18–20. The solid reagent subassembly is slipped into the outer jacket body 32 between a layer of thermal insulation 92 and the outer wall 28 of the filled inner container 5.

Figure 34:
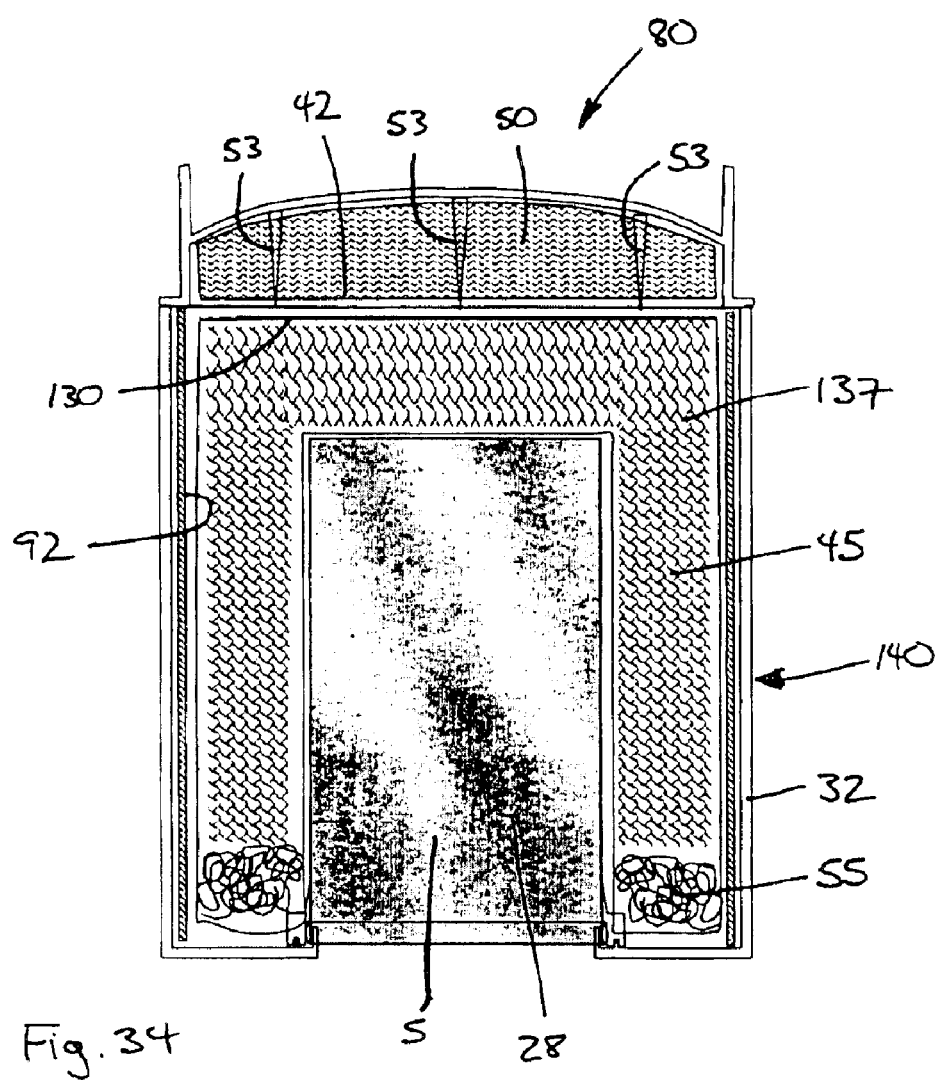
FIG. 34 illustrates the installation of an activation subassembly onto the outer jacket subassembly of FIG. 33.

The assembly is completed, as shown in FIG. 34, by installing a water-filled activation subassembly 80 to close the bottom of the outer jacket. The activation subassembly may be configured and assembled in substantially the same way as that described above in connection with FIGS. 15–17, or it may use the alternate actuator described above in connection with FIG. 27.

The solid first reagent 45 is thus packaged inside a vapor-barrier in the form of the thin-walled plastic bag 130. The material of the bag should be thin (perhaps on the order of 1–2 one-thousandths of an inch(0.004–0.008 millimeters)), and may advantageously be of a plastic with a low melting temperature. When the activation device 80 is depressed, its spikes 53 penetrate the foil or plastic membrane 42 to release the liquid second reagent 50. The spikes then penetrate further through the bag 130 to allow the liquid reagent to reach the solid reagent 45 inside the bag. This initiates the exothermic reaction in a relatively controlled way as the liquid percolates into the solid reagent through the openings in the membrane and the holes in the bag. As the temperature rises, the low melting temperature bag material melts away, thereby allowing more and more of the liquid to reach the solid reagent. The reaction accelerates, but without the initial steep temperature spike that might occur if the liquid reagent were simply dumped all at once into the solid.

The bag configuration 130 shown in these figures is also advantageous in corresponding generally to the space between the jacket body 32 and the inner container 5. If the solid reagent 45 is packed reasonably tight inside the bag, the solid reagent and the bag can provide structural support for the inner container inside the jacket. This may allow for the omission of the can support 95 (see FIG. 24), and the elimination of the assembly step required to place such a can support inside the jacket.

Figure 35:
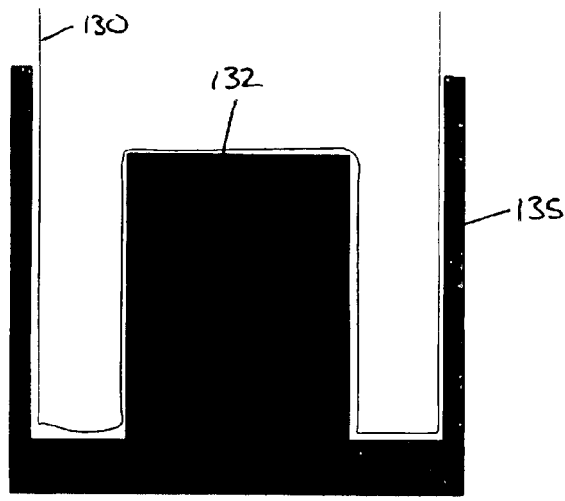
FIG. 35 shows a plastic bag placed inside a fixture during the assembly of an alternative embodiment of the invention.
Figure 36:
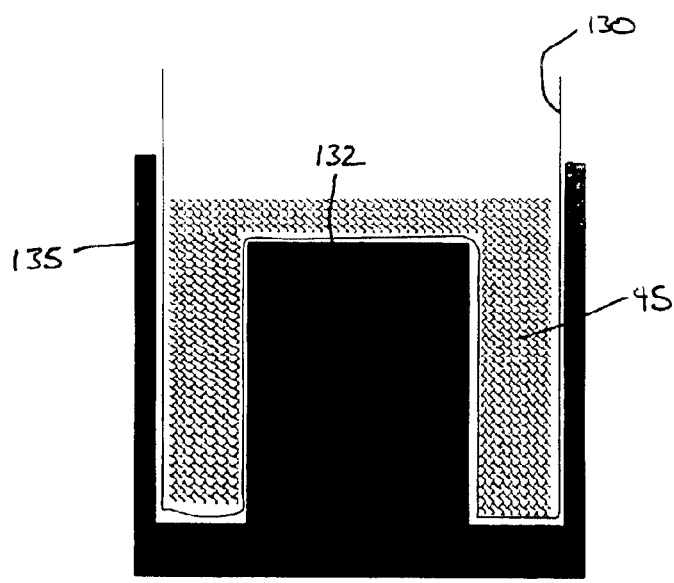
FIG. 36 shows the filling of a solid first reagent inside the plastic bag of FIG. 35.
Figure 37:
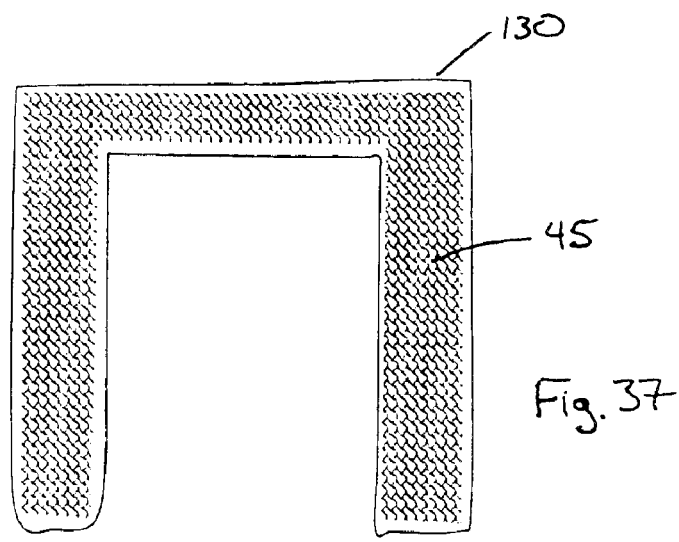
FIG. 37 shows a reagent subassembly created according to the steps illustrated in FIGS. 35 and 36.
Figure 38:
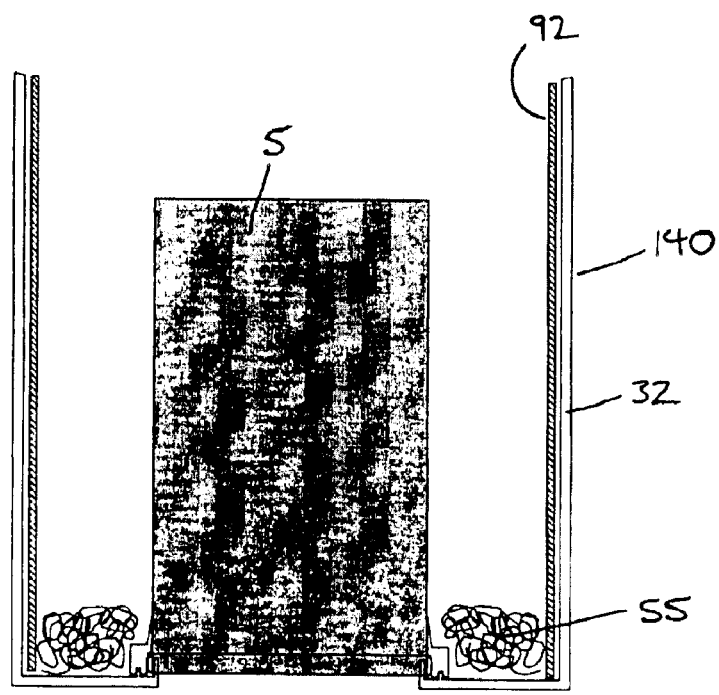
FIG. 38 illustrates an outer jacket subassembly with a steam condenser filled inside it.
Figure 39:
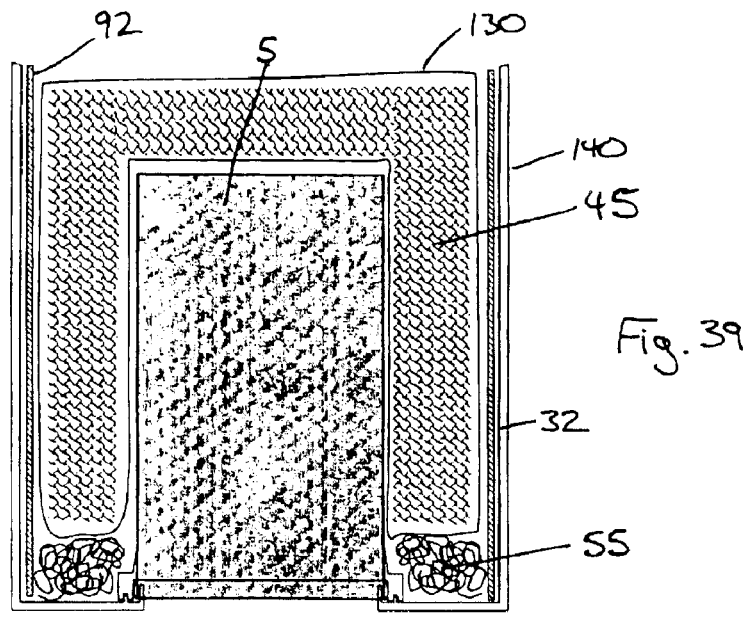
FIG. 39 shows the reagent subassembly of FIG. 37 installed in the outer jacket subassembly of FIG. 38.
Figure 40:
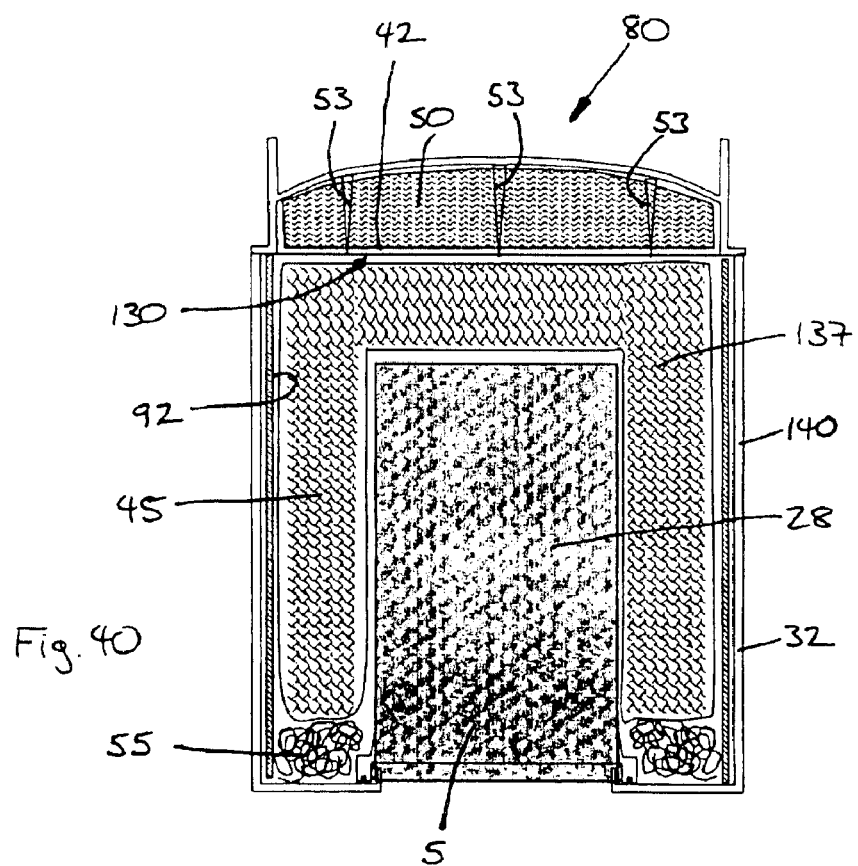
FIG. 40 illustrates the installation of an activation subassembly onto the outer jacket subassembly of FIG. 39 to complete an alternative embodiment of the invention.

Still another configuration is illustrated in FIGS. 35–40. This variant packages the first reagent 45 inside a plastic bag 130 as before, but the steam condenser in this variant is outside the bag. FIG. 35 shows the placement of the open plastic bag inside a supporting fixture 128. FIG. 36 illustrates the filling of the first reagent 45 into the bag. After the bag is filled and vacuum-sealed, it is lifted off the fixture as shown in FIG. 37. The steam condenser 55 is provided inside the outer jacket subassembly 140 as shown in FIG. 38 (and not inside the bag, as in the previous embodiment). The reagent filled bag 130 is then placed around the inner container 5 and over the steam condenser 55 inside the outer jacket body 32 as shown in FIG. 39. Finally, the activation subassembly 80 carrying the liquid reagent 50 is then sealed over the open end of the jacket body as shown in FIG. 40.

Though it is generally contemplated that all parts of the assemblies described in this document will be disposable, for convenience, at least parts of the assembly could be re-used and recycled by refilling the assembly with new temperature change chemicals and reinstalling a newly-filled inner container into the assembly.

Several self-contained temperature-change assemblies have been described to as examples of how the invention might be configured. The invention is not limited to these exemplary assemblies, though, and various modifications or additions will no doubt occur to those of skill in the art. The true scope of the invention should thus be determined primarily by reference to the appended claims, along with the full scope of equivalents to which those claims are legally entitled.

What is claimed is:

1. A self-contained, temperature-change container assembly comprising:
   an inner container;
   a jacket top ring disposed around a top surface of the inner container;
   a jacket body disposed around the inner container;
   a flexible jacket bottom secured to the jacket body, wherein the jacket top ring, the jacket body, and the jacket bottom enclose a first internal volume and a second internal volume outside of the inner container;
   a reagent separator between the first internal volume and the second internal volume;
   a first temperature-change reagent in the first internal volume;
   a second temperature-change reagent in the second internal volume; and
   a plurality of penetrators fixed to the jacket bottom;
   wherein flexing the jacket bottom presses the penetrators through the reagent separator to breach the reagent separator and form a plurality of openings in the reagent separator to allow the first and second temperature-change reagents to mix to initiate a chemical temperature-change reaction;
   and further comprising a steam condenser formed of a material that has a high thermal conductivity in direct contact with the material of the inner container.

2. The container assembly of claim 1, wherein the steam condenser comprises steel wool.

3. The container assembly of claim 1, wherein the inner container includes a top surface exposed outside of the jacket top ring, and wherein the steam condenser is in direct contact with the inner container near the top surface of the inner container.

4. A method for assembling a self-contained temperature-change container assembly, the method comprising:
   packaging a product inside a sealed container;
   installing a jacket top ring around a top surface of the sealed container;
   installing a jacket body around the sealed container;
   filling a first temperature-change reagent inside the jacket body and outside the sealed container in a first internal volume inside the jacket body;
   installing a steam condenser between the sealed container and the jacket body before filling the first temperature-change reagent inside the jacket body;
   providing a reagent separator inside the jacket body and outside the first temperature-change reagent;
   filling a second temperature-change reagent inside the jacket body with the reagent separator between the second temperature-change reagent and the first temperature-change reagent; and
   installing a jacket bottom onto the jacket body;
   wherein the jacket bottom is provided with a user-operable mechanism for breaching the reagent separator to allow the first and second temperature-change reagents to mix.

5. The method of claim 4, wherein installing the steam condenser includes filling a quantity of steel wool inside the jacket body and outside but in contact with the sealed container.

6. A self-contained, temperature-change container assembly comprising:
   an inner container;
   an outer jacket at least partially surrounding the inner container, wherein a first internal volume and a second internal volume are defined between the inner container and the outer jacket;
   a first temperature-change reagent inside the first internal volume;
   a steam condenser inside at least one of the first and second internal volumes;
   a second temperature-change reagent inside the second internal volume;
   a reagent separator between the first internal volume and the second internal volume;
   a movable member situated opposite the reagent separator; and
   at least one penetrator situated on the movable member;

wherein movement of the movable member urges the penetrator through the reagent separator to breach the reagent separator and to allow mixing of the first and second temperature-change reagents through said breach.

7. The container assembly of claim 6, wherein the inner container is a cylindrical metal can of a standard size.

8. The container assembly of claim 6, wherein the movable member is a flexible jacket bottom, wherein the outer jacket comprises a jacket top ring disposed around a top surface of the inner container and a jacket body secured to the jacket top ring and disposed around the inner container, and wherein the flexible jacket bottom is secured to the jacket body.

9. The container assembly of claim 6, wherein mixing the first and second temperature-change reagents initiates an exothermic reaction to increase the temperature of the inner container.

10. The container assembly of claim 9, wherein the first temperature-change reagent is calcium oxide and the second temperature-change reagent is water.

11. The container assembly of claim 6, wherein mixing the first and second temperature-change reagents initiates an endothermic reaction to reduce the temperature of the inner container.

12. The container assembly of claim 6, wherein the reagent separator comprises a thin membrane.

13. The container assembly of claim 12, wherein the thin membrane comprises a plastic film.

14. The container assembly of claim 12, wherein the thin membrane comprises a metal foil.

15. The container assembly of claim 6, wherein the reagent separator is located at a step on an inner wall of the outer jacket.

16. The container assembly of claim 6, wherein the movable member is a flexible member movable under pressure applied to the movable member on a side of the movable member opposite the second internal volume.

17. The container assembly of claim 6, wherein the at least one penetrator comprises at least three penetrators mounted on the movable member and spaced apart from one another opposite the reagent separator.

18. The container assembly of claim 17, wherein the at least one penetrator comprises at least five penetrators mounted on the movable member and spaced apart from one another opposite the reagent separator.

19. The container assembly of claim 18, wherein the at least one penetrator comprises at least nine penetrators spaced apart from one another opposite the reagent separator.

20. The container assembly of claim 6, wherein the steam condenser comprises a material having a high thermal conductivity in direct contact with the material of the inner container.

21. The container assembly of claim 6, wherein the steam condenser comprises steel wool.

22. The container assembly of claim 6, wherein the inner container includes a top surface exposes outside of the outer jacket, wherein the steam condenser comprises steel wool in the first internal volume, and wherein the steam condenser is in direct contact with the inner container near the top surface of the inner container.

23. The container assembly of claim 6, and further comprising a thermal insulator in the first internal volume between the outer jacket and the first temperature change reagent.

* * * * *